Dec. 16, 1958  E. H. KENDALL  2,864,271
FORGING MANIPULATOR
Filed Feb. 11, 1953  6 Sheets-Sheet 1

INVENTOR
EDGAR HOMER KENDALL

BY *Francis J. Klempay*
ATTORNEY

Dec. 16, 1958     E. H. KENDALL     2,864,271
FORGING MANIPULATOR

Filed Feb. 11, 1953     6 Sheets-Sheet 2

INVENTOR
EDGAR HOMER KENDALL

BY *Francis J. Klempay*

ATTORNEY

Dec. 16, 1958  E. H. KENDALL  2,864,271
FORGING MANIPULATOR
Filed Feb. 11, 1953  6 Sheets-Sheet 3

INVENTOR
EDGAR HOMER KENDALL

BY *Francis J. Klempay*

ATTORNEY

Dec. 16, 1958　　　　E. H. KENDALL　　　　2,864,271
FORGING MANIPULATOR

Filed Feb. 11, 1953　　　　　　　　　　　　6 Sheets-Sheet 4

INVENTOR
EDGAR HOMER KENDALL

BY *Francis J. Klempay*

ATTORNEY

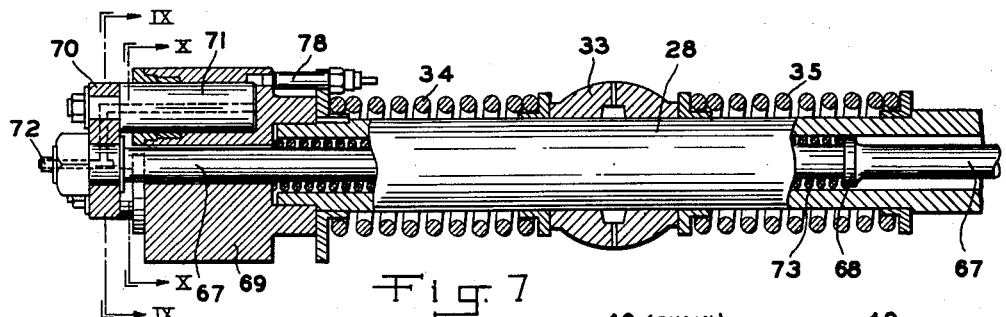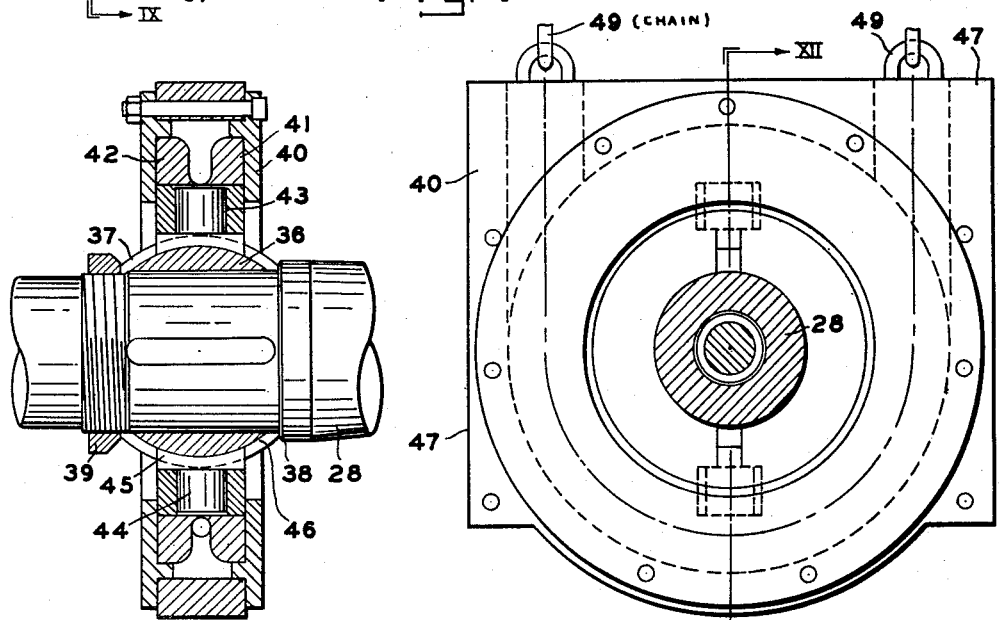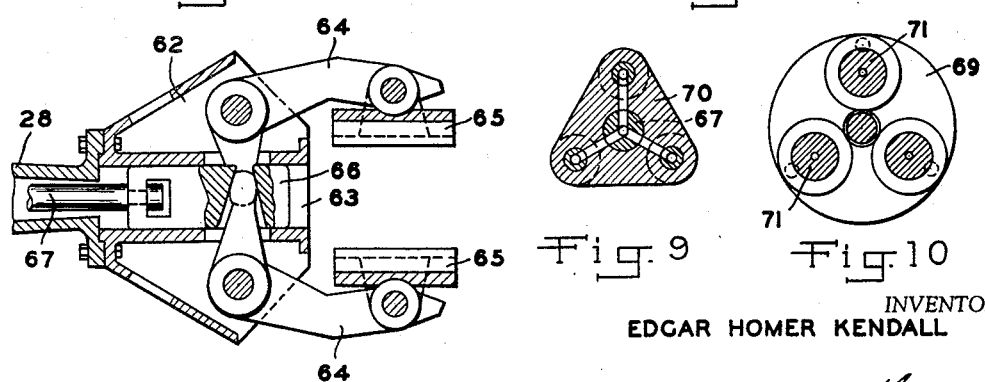

United States Patent Office 2,864,271
Patented Dec. 16, 1958

2,864,271

FORGING MANIPULATOR

Edgar Homer Kendall, Alliance, Ohio

Application February 11, 1953, Serial No. 336,247

13 Claims. (Cl. 78—96)

This invention relates to apparatus for handling and manipulating work pieces particularly in and about forging presses and has as its primary object the substantial simplification of the design and construction of such apparatus for the purpose of reducing the complexity, cost and mass of the apparatus while yet improving the operating characteristics of the same. It is common practice in prior apparatus for supporting and manipulating work pieces in and about forging presses to provide an elongated and generally horizontal shaft or "peel" which carries at its forward projecting end a powerful tong or clamp which engages the work piece, and in order that the work piece may be adequately manipulated it is necessary that the peel be mounted for rotational movement, bodily up and down movement, upwardly and downwardly and side-to-side tilting movements, as well as longitudinal movement along its axis. A movable wheeled carriage affords the last-mentioned component of movement and heretofore the other movement components were made possible by journaling a substantial portion of the peel in an elongated housing which in turn was universally mounted for power actuation in a frame work on the movable carriage, all of which required a very complicated construction. In the apparatus of my invention the heavy peel housing is entirely eliminated, resulting in a much lighter and simplified construction which is vastly cheaper to construct and maintain, which is much more responsive to directed control, and which requires less power application for manipulation along the respective movement components.

Another object of my invention is the provision in apparatus of the general type herein described of improved arrangement for actuating the work holding peel in various directions and for retaining the same in predetermined positions whereby the shock absorbing qualities of the complete assembly are substantially enhanced, it being understood that this characteristic is very important due to the substantial weight of the work pieces being handled and of the parts of the manipulating apparatus as well as to the very severe shock forces applied by the forging dies of the presses. It should be observed at this point that the reduction in mass and inertia of the movable peel assembly due to the elimination of the housing above referred to is highly beneficial in this regard although the invention does not wholly reside in this aspect but further resides in improved shock absorbing mountings for the peel itself.

Heretofore in forging maniplators the power means for rotating the peel in opposite directions has been a particular source of difficulty due to the severe shocks resulting from repeated sudden stops occasioned by the forging tool of the press or hammer. It is accordingly another object of this invention to eliminate this source of trouble and in the apparatus herein disclosed this improvement is accomplished by isolating the rotating mechanism from the peel proper or from the journal housings for the peel and by interconnecting the peel and the rotating means by means of an articulate member such as a chain or cable which is operative to transmit the shocks to a suitable shock-absorbing feature built into the rotating means.

A further object of the invention is the provision in apparatus of the general kind outlined above, of improved mechanism for actuating and applying gripping force to the gripping means or tongs mounted on the forward end of the peel whereby the construction is much simplified and less expensive than heretofore thought necessary, and whereby the assembly is better able to withstand the severe shock conditions of normal service without deterioration of the apparatus.

Yet another object of the invention is the provision, in a forging manipulator, of an improved hydraulic control circuit for use in conjunction with the various shockproofed power means for effecting the components of movement of the peel, some of which actuating means are suggested above, whereby the completely assembled apparatus has improved sensitivity of response to control manipulation by the operator with a minimum of overtravel or "hunting" so that in the hands of an experienced operator the apparatus is capable of sustaining high speed operation.

The above and other objects and advantages of the invention will become apparent upon consideration of the following detailed specification and the accompanying drawing wherein there is disclosed a certain preferred embodiment of the invention.

In the drawings:

Figures 7 and 8 are longitudinal sections of the power and gripper end portions, respectively, of the peel which forms part of the apparatus disclosed;

Figures 9 and 10 are sectional views taken along the lines IX—IX and X—X, respectively, of Figure 7;

Figure 11 is a fragmentary section taken along the line XI—XI of Figure 4;

Figure 12 is a section taken along the line XII—XII of Figure 11; and

Figure 1:
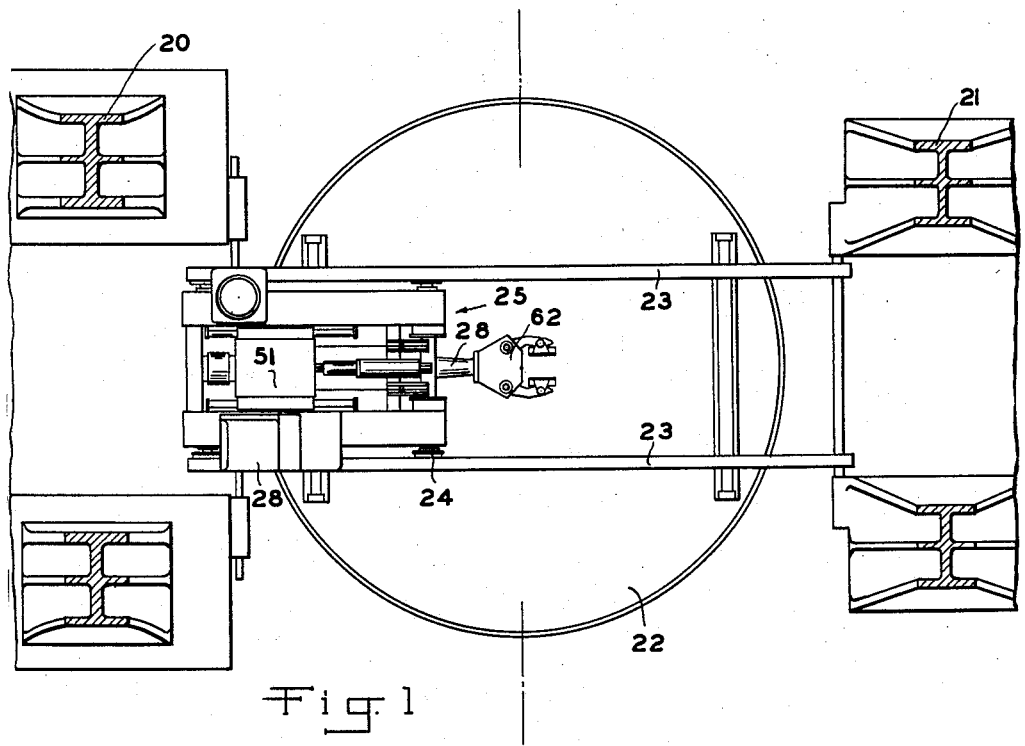
Figures 1 and 2 are fragmentary plan and elevational views, respectively, of a forging manipulator installation constructed in accordance with the principles of my invention.
Figure 2:
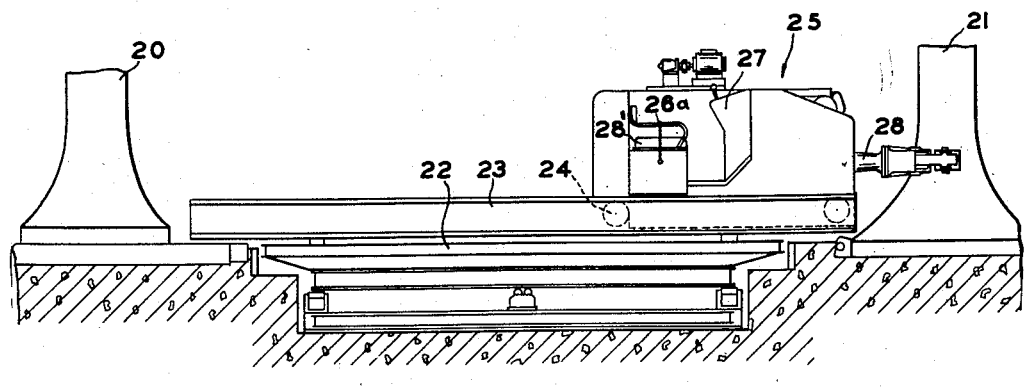

Referring first to Figures 1 and 2 which illustrate a normal installation for the apparatus of this invention, the reference numerals 20 and 21 designate the side housings for forging presses or hammers, and interposed between a pair of these working units is a turntable 22 mounting a pair of parallel inwardly turned channels 23 in which are guided the four flanged supporting wheels 24 of the manipulator carriage 25. Suitable means, not shown, is conventionally employed to rotate the turntable 22, and it should be further understood that in normal practice a furnace or a conveyor will be associated with the manipulator in such relation that a heated billet or other object may be deposited in a position to be gripped by the manipulator after which the work piece is moved and handled by the manipulator in and between the adjacent presses or hammers as is required.

Two of the flanged supporting wheels of the manipulator, preferably those adjacent the gripping end of the manipulator, are arranged to be power driven in either direction by a reversible motor 26 mounted on the carriage 25 and which is energized and controlled by suitable means, as the control lever 26a for example. Such control means as well as various other control levers and valves to be herinafter more fully described will normally be mounted on a control pulpit 27 or at least adjacent to the operator's seat 28' as shown in Figure 2. The operator's seat 28' and the adjacent pulpit 27 are mounted in a recess formed in the right wall of the general mass of the carriage 25. It should be understood that motor 26 enables the carriage 25 to be moved back and forth rapidly on the rolls formed by the channels 23 under precise and instant control of the operator. By this means the work pieces are taken off of conveyors or out of furnaces and moved into and out of the presses or hammers as well as being manipulated longitudinally in these working units as is required during formation of products.

Figure 3:
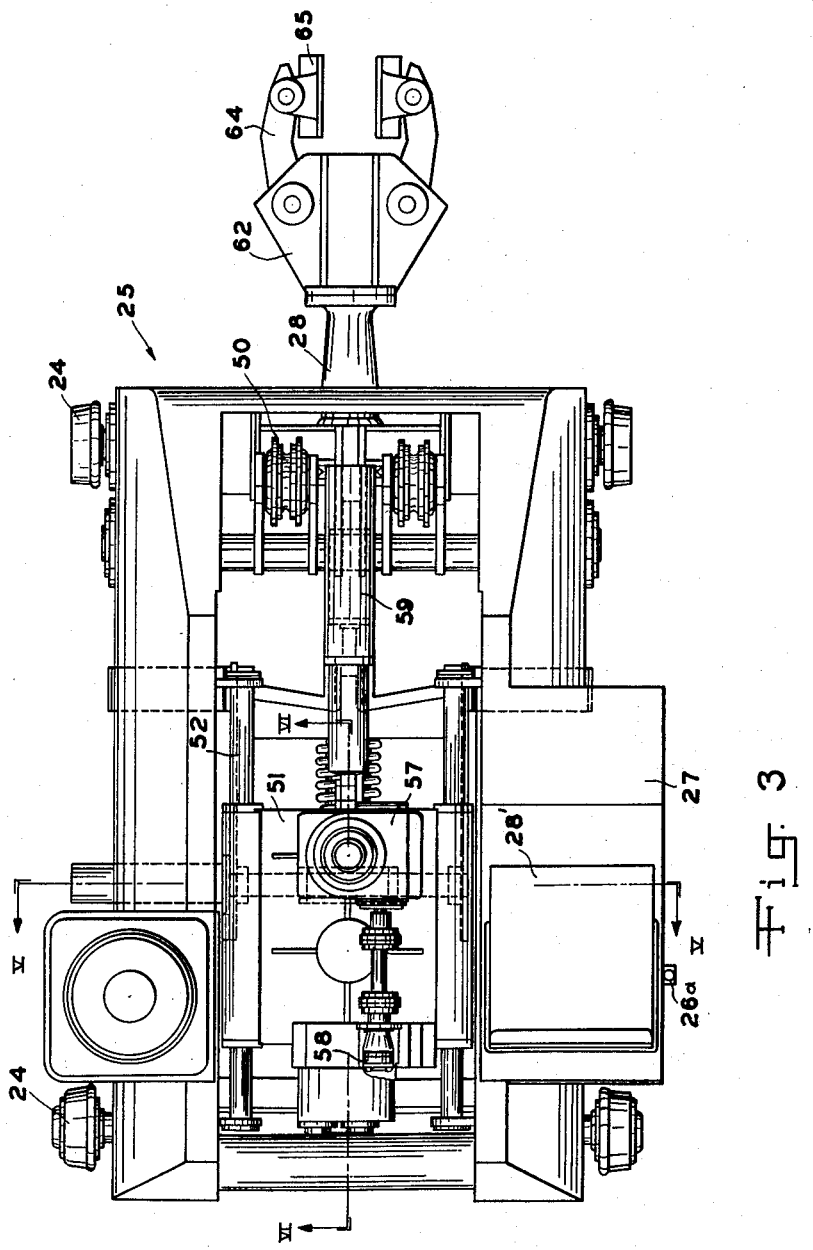
Figure 3 is a plan view of the manipulator carriage with mounted adjuncts.
Figure 4:
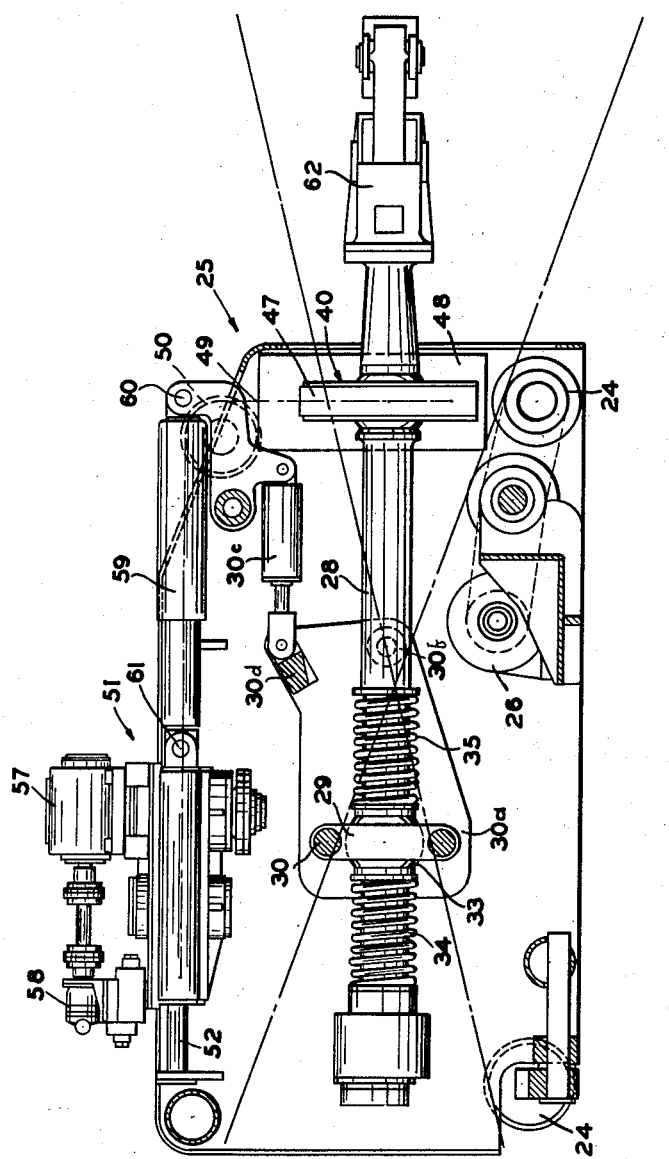
Figure 4 is a fragmentary longitudinal section of the apparatus of Figure 3.
Figure 5:
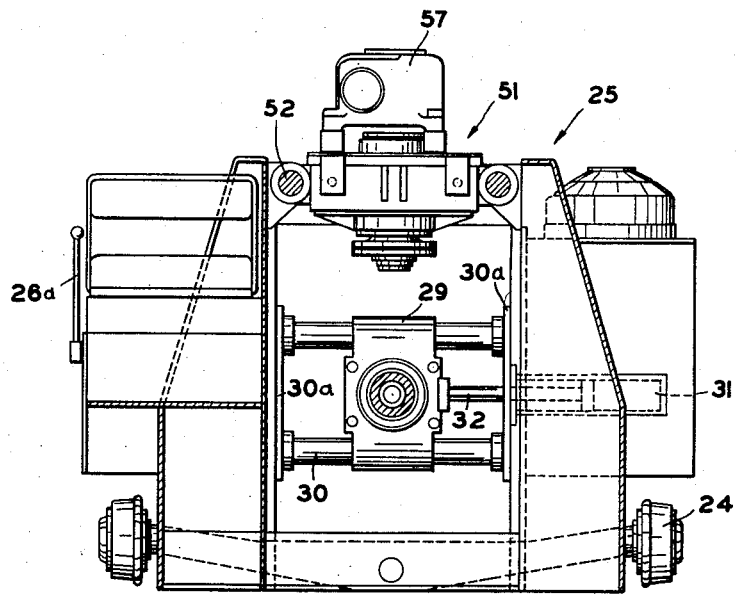
Figure 5 is a fragmentary transverse section taken along the line V—V of Figure 3.

The carriage 25 is a box-like assembly preferably fabricated from plate end sections by welding and as evident from Figures 3, 4 and 5 this assembly is formed with a centrally disposed and longitudinally extending tunnel-like opening in which is housed the major portion of the rod-like peel 28. As shown in Figures 4 and 5 the rear end portion of the peel 28 is supported by a member 29 which in turn is slidably mounted on the spaced parallel rods 30 which horizontally and transversely span the above mentioned tunnel-like opening. Rods 30 are rigidly attached at their ends to plates 30a each of which are pivotally mounted as shown at 30b in Figure 4, and for rocking the plates 30a upwardly and downwardly I provide the double-acting hydraulic cylinder 30c which is pivotally connected at one end to the frame structure 25 and which has its piston rod pivotally connected to a strut 30d which rigidly bridges the two plates 30a. Hydraulic cylinder 31 having its piston rod 32 connected to the member 29 is provided for the purpose of shifting the member 29 back and forth as required in the operation of the manipulator. Of course, the cylinder 31 is carried by one of the plates 30a as shown in Figure 5. Member 29 is formed with a centrally disposed spherical socket in which is received a spherical thimble 33 in which the peel 28 is slidably mounted. Coil springs 34 and 35 engage opposite ends of the thimble 33 and at their outer ends have suitable abutting relation with the peel 28 so that while the latter has a normally fixed longitudinal relation to the supporting member 29 it can be displaced longitudinally in either direction with respect thereto for the absorption of shocks.

The forward end of the peel 28 is supported by an assembly which includes a thimble 36 which is keyed onto the peel and which has a spherical outer surface 37. Thimble abuts a shoulder 38 on the peel and is rigidly clamped thereto by a lock nut 39. Swiveled on the surface 37 is a block 40 having a circular race 41 formed therein in which rotates a sprocket 42 which is a ring-like member having teeth on its outer periphery to receive a drive chain and which has in its inner periphery a pair of diametrically opposed and inwardly opening cylindrical sockets 43. Rotatable within the last mentioned sockets are the cylindrical shanks 44 of keys 45 which are fitted within grooves 46 formed in the spherical surface 37. The side surfaces 47 are flat in parallel and have flat sliding interengagement with a pair of spaced parallel hardened steel wear plates 48 which are affixed to the side walls of the tunnel-like opening through the carriage frame mentioned above. As indicated in Figures 4 and 11 the outer periphery of the sprocket 42 is adapted to receive a depending loop of an endless chain 49, the two upwardly extending reaches of which are entrained over a pair of pulleys 50 journaled on the carriage frame above the tunnel-like opening therethrough. Means, to be hereinafter described, is provided to simultaneously draw both of these reaches upwardly or to simultaneously lower both reaches whereby the sprocket 42 may be either raised or lowered, and such means is further operative to advance the chain in either direction along a fixed path whereby the sprocket 42 may be rotated. It should be apparent therefore that the operating end of the peel may be either raised or lowered and/or rotated in either direction regardless of the transverse position of the tail end of the peel, the spherical interconnection between the thimble 36 and block 40 as well as the rotatable mounting of the keys 45 in the sprocket 42 enabling this universal drive action to take place.

Figure 6:
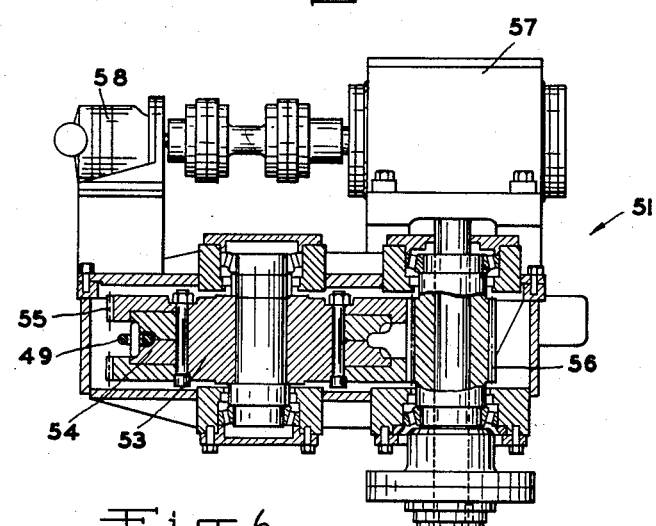
Figure 6 is a detailed sectional view taken along the line VI—VI of Figures 3 and 4.

For the purpose of actuating the chain 49 in the manner outlined above I provide an assembly which is designated generally by the reference numeral 51 and which is slidable longitudinally on the spaced parallel rods 52 anchored in the frame structure 25. The assembly 51 comprises a housing in which is journaled for rotation in a horizontal plane a composite sprocket and gear 53 (see Figure 6) having a sprocket portion 54 to receive the chain 49 and a split spaced radially outward gear portion 55. Meshing with the gear 55 is a pinion 56 driven by a worm reducer 57 from a hydraulic fluid motor 58 of the reversible type. All these parts are mounted on the housing of the slidable assembly 51. For shifting the assembly 51 back and forth longitudinally on the carriage I provide a ram-type of hydraulic cylinder 59 which is anchored at 60 to the frame structure of the carriage and which is connected at 61 to the assembly 51.

Chain 49 is of the endless type with one of its end loops entrained about the sprocket 42 housed within the block 40 and with the other of its end loops entrained about the sprocket 54 of the assembly 51 as aforesaid. Therefore it should be apparent that upon actuation (expansion) of the cylinder 59 the chain 49 will be bodily moved toward the rear of the assembled apparatus thereby raising the forward or work-gripping end of the peel 28. Upon the release of hydraulic fluid from the cylinder 59 the forward end of the peel may drop downwardly, and in this manner the forward end of the peel may be raised and lowered very readily by the simple manual manipulation of a hydraulic fluid control valve as will be understood. In any vertical position of the forward end of the peel and even while the same is being raised or lowered the fluid motor 58 may be energized in either direction to rotate the sprocket 54 and thereby drive the chain 49 along its circuitous path to rotate the peel 28 in either direction.

Referring now more particularly to the construction of the peel and the gripping means mounted thereon it will be observed that there is rigidly attached to the forward end of the peel rod 28 a flared member 62 having a centrally disposed bore 63 therein as shown in Figure 8. Pivotally mounted in the two opposed flarings of the member 62 is a pair of bellcrank levers 64 to the outer ends of which are pivotally connected the grip plates 65 (normally of arcuate cross section) while the inner ends or legs of which are received in side-by-side relation in vertical apertures or recesses formed in a block 66 slidably received in the bore 63. It should be apparent that upon movement of the block 66 in an outward direction the clamp plates 65 will be brought toward each other while upon movement of the block 66 in the opposite direction these clamp plates will be moved apart. To provide actuating means for the block 66 the peel rod 28 is made hollow to slidably receive an actuating rod 67 which is suitably connected at its outer end to the block 66 for forcibly moving the same in opposite directions as aforesaid. The means for actuating rod 67 in opposite directions will now be described in detail.

Referring particularly to Figure 7, the rod 67 is shouldered at 68 at a point substantially removed from the rear end portion of the rod, which rear end portion extends entirely through a block 69 which is rigidly mounted on the rear end of the peel rod 28. Rigidly mounted on the outer end of the rod 67 is a crosshead 70 to which is rigidly attached a plurality of parallel and circumferentially spaced rams 71 which are slidably received in cylinders formed in the block 69. For the purpose of conducting fluid under pressure into the cylinders of the block 69 whereby the rams 71 and the rod 67 will be moved to the left as viewed in Figure 7, crosshead 70 as well as the outer end portion of the rod 67 and the rams 71 are formed with fluid passages as shown in Figures 7 and 9 whereby fluid pressure from a flexible conduit 72 may be distributed to these cylinders. Thus, upon fluid pressure being supplied through conduit 72 and the consequent movement of the rod 67 in the direction stated the clamp plates 65 will be brought forcibly together to tightly grip the billet or other work piece to be manipulated. The clamp is opened by a compression coil spring 73 which encircles the rod 67 intermediate the block 69 and the shoulder 68 on the rods 67.

Figure 13:
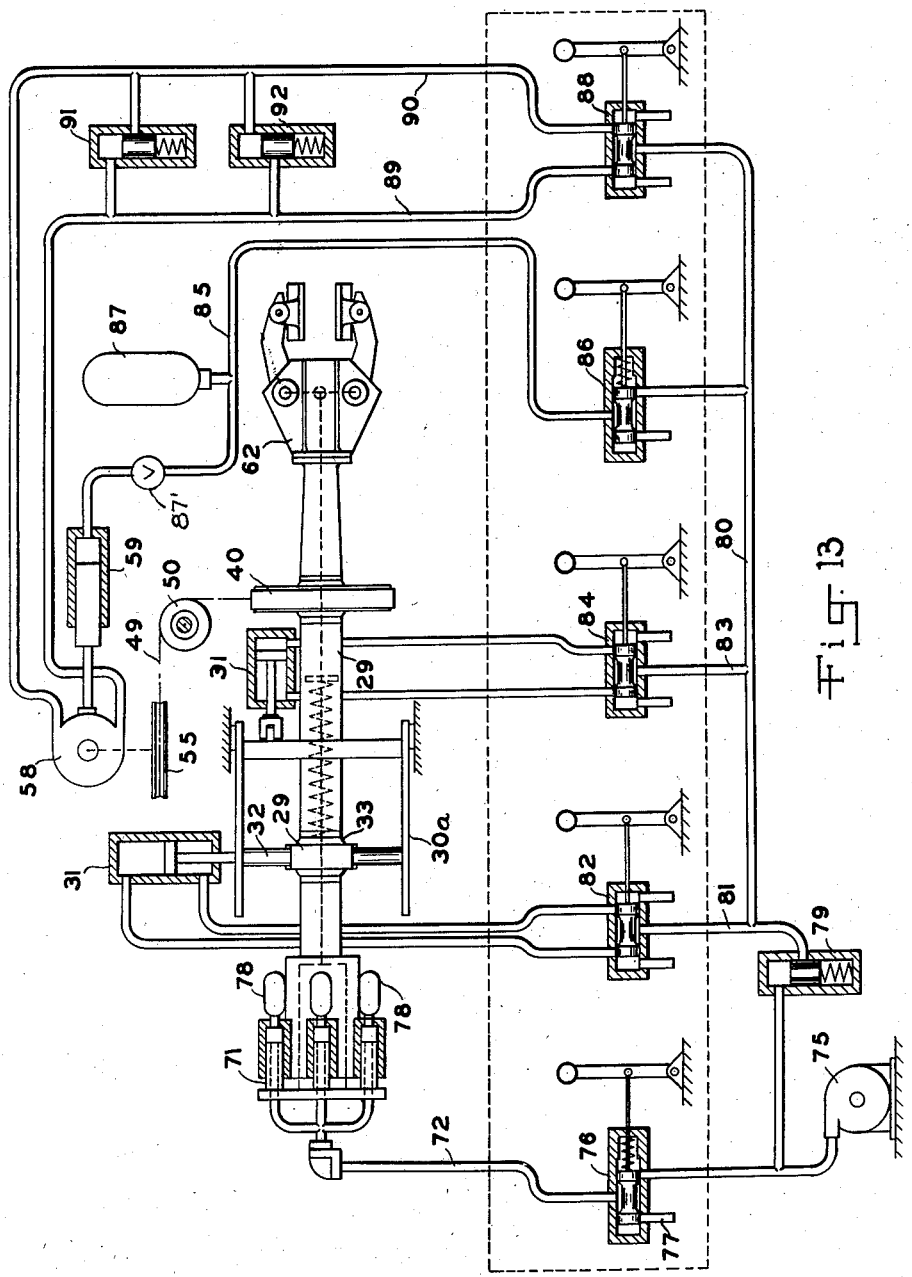
Figure 13 is a schematic showing of the hydraulic control and operating circuit employed in the apparatus disclosed.

As stated above, apparatus of the character herein involved is subject to exceptionally severe conditions of service particularly as regards the application of heavy shock loads through the work piece being held and thus to the clamp and peel of the apparatus. Various mechanical devices for absorbing such shocks have been described above but since these forces are also transmitted into the hydraulic actuating lines of the apparatus provision must be made for protecting such apparatus and the same will now be described in connection with the hydraulic control circuit shown in Figure 13. Referring now to this latter figure, wherein parts corresponding with parts described above bear identical reference numerals, the reference 75 designates the fluid pump which may be motor driven and mounted on the carriage of the apparatus for supplying fluid pressure to the various actuating mechanisms of the apparatus and, as shown, the outlet of pump 75 is connected directly with a manually operable three-way valve 76 which is also connected to the conduit 72 leading to the clamp cylinders in block 69 and to a return line 77 leading to a storage sump, not shown. Communicating with each of the cylinders in the block 69 is a small air-hydraulic accumulator 78 which is mechanically mounted as shown in Figure 7. Thus upon the application of fluid pressure to these cylinders the fluid pressure is cushioned by the air (or gas) in the accumulators to absorb any shock which may be transmitted in one direction through the clamp actuating rod 67.

Also connected with the outlet of the pump 75 is a sequence valve 79 which opens upon a predetermined desired pressure being built up to deliver fluid pressure to a distribution conduit 80. From conduit 80 a branch 81 leads to a manual four-way valve 82 which is connected with a double-acting cylinder 31 to shift the block 29 laterally as explained above. Likewise, a branch conduit 83 leads to a manual four-way valve 84 which is connected with the double-acting cylinder 30c to raise and lower the plates 30a under manual control to level or tilt the peel 28 as desired regardless of the elevated position of the peel supporting block 40.

As explained above the forward end of the peel including the clamp as well as the work load supported thereby is raised and lowered by the hoist cylinder 59. To controllably actuate the latter while yet incorporating therein adequate shock-absorbing characteristics I provide a hydraulic fluid conduit 85 which is connected with the main conduit 80 through a manual three-way valve 86 and which is in communication with an air-hydraulic accumulator 87 of adequate size in relation to the displacement of cylinder 59 to allow an appreciable movement of the ram in cylinder 59 when subjected to shock loads. This is an important feature of the present invention since it should be understood that in the normal use of forging manipulators abrupt downward movement of the work piece and peel by a forge hammer or die is a common occurrence and severe damage may result if some compensating shock-absorbing provision is not provided. In the operation of the apparatus of this invention the peel clamp and work piece are raised by actuating valve 86 to admit more fluid through conduit 85, are lowered by releasing fluid from conduit 85, and are held vertically stationary by moving the valve 86 to neutral position whereby the fluid is locked in the cylinder 59, conduit 85 and accumulator 87. In the latter condition the suspended weight in effect dances on the pressure of the compressed gas or air in the accumulator 87, making for a very sensitive low-inertia shock-absorbing provision which contributes substantially to the longevity of the assembled apparatus under severe conditions of service. In accordance with the preferred teachings of the invention a suitable flow metering valve 87' is provided in the conduit 85, between the accumulator 87 and cylinder 59. The valve 87' acts as a damper so that the peel 29 will not tend to oscillate unnecessarily.

The hydraulic fluid motor 58 for rotating the peel 28 as explained above, is of the reversible type and as such is supplied with the flow of fluid under pressure in either direction by a manual four-way valve 88 supplied by the main conduit 80 and connected with the motor by the conduits 89 and 90. These latter conduits are interconnected by a pair of inversely directed sequence valves 91 and 92 which open at predetermined pressures to limit the pressure built up on either side of the motor 58 to avoid damage to the parts under shock loads as will be readily understood.

The general operation of the assembled apparatus described above is such that the work piece to be handled may be quickly and fully manipulated in all aspects necessary for the rapid production of forged articles. The peel which carries the work piece is moved longitudinally back and forth by running the carriage 25 back and forth on the turntable 22 and may be swung around as required by rotating the turntable. The peel is raised and lowered and tilted up or down as required by the conjoint actuation of cylinders 30c and 59, and is angled sidewise in either direction by actuation of the cylinder 31. Further, the peel may be readily rotated in either direction even simultaneously with other adjustments by actuation of the fluid motor 58. All of these functions are obtained in the apparatus of my invention through relatively simple yet rugged endurable mechanisms which have inherently incorporated in them adequate provisions for resisting the shock and vibration to which such apparatus is normally subjected. Those novel features of the apparatus of my invention which contribute to the substantial utility of the same are distinctly set out in the appended claims and in connection therewith it should be understood that the above specifically described embodiment of the invention is representative only of the manner in which the invention may be exemplified since many changes may be made therein without departing from the spirit or scope of the invention.

I claim:

1. In a forging manipulator of the kind having a movable carriage and a generally horizontal elongated clamp supporting peel mounted on said carriage, the improvement comprising a supporting block slidably mounted for vertical movement in said carriage, a sprocket journaled in said block for rotation in a generally vertical plane, said peel being received axially in said sprocket and keyed thereto whereby said sprocket rotates said peel, a ball and socket interconnection between said peel and sprocket whereby said peel may have varying angular relation with the plane of the sprocket, a chain having a depending loop entrained about said sprocket, and power means on said carriage to either raise and lower said chain bodily or to move the same along its path whereby said sprocket and peel may be moved vertically or rotated as desired.

2. Apparatus according to claim 1 further characterized in that said power means comprises a housing slidably mounted on said carriage and journaling a second sprocket over which a second loop of said chain is entrained, means to rotate said second sprocket, and means to slidably move said housing.

3. Apparatus according to claim 2 further characterized in that said means to rotate said second sprocket comprises a reversible hydraulic fluid motor, a source of hydraulic fluid pressure and a four-way valve for connecting said source with said motor through a pair of conduits and a pair of inversely related pressure-responsive relief valves interconnecting said conduits.

4. Apparatus according to claim 2 further characterized in that said means to slidably move said housing comprises a hydraulic cylinder, a source of hydraulic fluid pressure, a valve interconnecting said source and cylinder, and a gas-hydraulic accumulator interconnected with said cylinder for absorbing shock loads which may be applied to said housing in one direction.

5. In a forging manipulator of the kind having a movable carriage and a generally horizontal elongated clamp supporting peel mounted on said carriage, the improvement comprising a pair of spaced parallel bell-crank levers pivotally mounted on said carriage for movement about a horizontal axis, a pair of vertically spaced transverse slide rods interconnecting said levers, a block having a spherical socket slidably mounted on said rods, power means carried by said levers to slidably move said block, power means to rock said levers about said axis, a bulbous thimble received in said socket, said peel being slidably received in said thimble, and vertically movable means supported on said carriage for rotatably supporting said peel at a point spaced longitudinally along said peel from said thimble.

6. Apparatus according to claim 5 further characterized in that said vertically movable means comprises a block slidably guided between a pair of spaced parallel vertical wear plates, a sprocket journaled in said block for rotation in a generally vertical plane, said peel being received axially in said sprocket and keyed thereto whereby said sprocket rotates said peel, a ball and socket interconnection between said peel and sprocket whereby said peel may have varying angular relation with the plane of the sprocket, a chain having a depending loop entrained about said sprocket, and power means on said carriage to either raise and lower said chain bodily or to move the same along its path whereby said sprocket and peel may be moved vertically or rotated as desired.

7. In a forging manipulator of the kind having a movable carriage and a generally horizontal elongated work supporting peel mounted on said carriage, the improvement comprising a pair of bulbous enlargements on said peel at longitudinally spaced points, a pair of supporting blocks each having a spherical socket for receiving said enlargements, means mounting one of said blocks in said carriage for vertical and transverse movement, means mounting the other of said blocks for vertical movement in said carriage, power means to raise and lower said blocks independently, power means to shift said one of said blocks transversely, and power means to rotate said peel.

8. Apparatus according to claim 7 further characterized in that said power means to rotate said peel comprises a sprocket journaled in said other of said blocks for rotation about the general axis of said peel, said sprocket being keyed to said peel, and a drive chain having a loop entrained about said sprocket.

9. In a forging manipulator of the kind having a movable carriage, and an elongated work-supporting peel mounted on said carriage for limited universal movement with respect thereto; the improvement which comprises a bulbous thimble mounted on said peel for limited resilient longitudinal sliding movement with respect thereto and comprising a universal pivotal mounting for said peel, a work-engaging clamp comprising a part of said peel and positioned at the forward end thereof, an operating rod for said clamp extending longitudinally through said peel, hydraulic actuating means connecting said peel and said rod whereby said rod may be shifted longitudinally with respect to said peel to operate said clamp, fluid conduit means including a rotatable fluid joint connecting said actuating means, and gas-hydraulic accumulator means associated with said actuating means for absorbing shock forces imparted to said clamp.

10. In a forging manipulator of the kind having a carriage, an elongated work-supporting peel, and means on said carriage to movably support said peel; the improvement in said last mentioned means comprising a hydraulic actuator forming an active part of said support, a gas-hydraulic accumulator operatively associated with said actuator to resiliently absorb shock forces imparted to said actuator, and fluid passage means connecting said accumulator including means to restrict the flow of fluid in one direction.

11. In a forging manipulator of the kind having a carriage, an elongated work-supporting peel, and means on said carriage to rotate said peel; the improvement in said last mentioned means comprising a reversible fluid motor, a pair of conduit members connecting said motor, a source of pressure fluid for said motor, and pressure relief means in said conduit members having predetermined pressure settings and operative upon the application of a predetermined rotary force to said peel independently of said motor to exhaust fluid from said conduit members whereby said peel may rotate independently of the rotation of said motor when said predetermined rotary force is applied to said peel.

12. In a forging manipulator having a movable carriage and a generally horizontal elongated clamp-supporting peel mounted thereon, the improvement comprising a pair of transversely spaced parallel vertical plates mounted on said carriage, a block having parallel side surfaces received between said plates and slidable vertically and horizontally with respect thereto, the forward end of said peel extending centrally through said block and journaled therein, means supporting the rear end portion of said peel in said carriage comprising means to yieldably restrain axial movement of the peel in either direction, means to raise and lower said block, means to rotate said peel, said peel being journaled in said block with a ball and socket interconnection whereby said peel may have universal angular adjustment with respect to said block, and means to move said means supporting the rear end portion of said peel in both horizontal and vertical directions.

13. In a forging manipulator of the kind having a movable carriage and a generally horizontally elongated clamp-supporting peel mounted on said carriage, a rear pivotal support for said peel, a forward supporting block for said peel, guide plates on said carriage to limit horizontal lateral movement of said block with respect to said carriage, means to raise and lower said peel and means to rotate said peel, said means to raise and lower comprising a looped supporting line entrained around said block and said means to rotate comprising means to move said looped supporting line along its path, said means to move including a reversible fluid motor, a source of fluid pressure, a pair of conduit members connecting with said motor, pressure relief means in said conduit members having predetermined pressure settings, and said pressure relief means being operative upon the application of a predetermined rotary force to said peel and said supporting line independently of said motor to exhaust fluid from said conduit members in order that said peel may rotate independently of said rotation of said motor when said predetermined rotary force is applied to said peel.

References Cited in the file of this patent

UNITED STATES PATENTS 144,526    Foulis ---------------- Nov. 11, 1873

(Other references on following page)

UNITED STATES PATENTS

| | | |
|---|---|---|
| 627,825 | Lentz | June 27, 1899 |
| 1,074,863 | Heppenstall | Oct. 7, 1913 |
| 1,273,141 | Brosius | July 23, 1918 |
| 1,791,013 | Rudolph | Feb. 3, 1931 |
| 1,881,169 | Brosius | Oct. 4, 1932 |
| 1,930,467 | Brosius | Oct. 17, 1933 |
| 2,053,292 | Keller et al. | Sept. 8, 1936 |
| 2,221,539 | Gehret | Nov. 12, 1940 |
| 2,257,546 | Dienenthal et al. | Sept. 30, 1941 |
| 2,314,686 | Brosius | Mar. 23, 1943 |
| 2,345,572 | Brosius | Apr. 4, 1944 |

FOREIGN PATENTS

| | | |
|---|---|---|
| 800,623 | Germany | Nov. 23, 1950 |
| 1,028,869 | France | May 28, 1953 |